United States Patent [19]

Fasoli

[11] Patent Number: 5,720,378
[45] Date of Patent: Feb. 24, 1998

[54] ROLLER CONVEYOR TO ARRIVE AT THE PINCH-ROLL OF THE WINDING REEL OF A HOT STRIP ROLLING TRAIN

[75] Inventor: Fabio Fasoli, Acquasparta, Italy

[73] Assignee: Danieli & C. Officine Meccaniche SpA, Ruttrio, Italy

[21] Appl. No.: 613,332

[22] Filed: Mar. 11, 1996

[30] Foreign Application Priority Data

Mar. 15, 1995 [IT] Italy ............................ UD95A0041

[51] Int. Cl.⁶ .................................................. B65G 39/00
[52] U.S. Cl. ........................... 198/780; 198/786; 198/456
[58] Field of Search ........................... 198/780, 781.05, 198/415, 781.06, 783, 784, 785, 456, 787, 788, 789; 271/225; 72/206

[56] References Cited

U.S. PATENT DOCUMENTS

| | | |
|---|---|---|
| 2,986,262 | 5/1961 | Powers . |
| 3,949,194 | 4/1976 | Catto ................................ 235/61 |
| 5,156,391 | 10/1992 | Roller ................................ 271/227 |
| 5,167,409 | 12/1992 | Higeta ................................ 271/225 |
| 5,195,627 | 3/1993 | Wyman ............................ 198/415 X |

FOREIGN PATENT DOCUMENTS

| | | | |
|---|---|---|---|
| 4034606 | 10/1990 | Denmark . | |
| 4030222 | 11/1991 | Denmark . | |
| 9302694.3 | 4/1993 | Denmark . | |
| 4205310 | 8/1993 | Denmark . | |
| 9404883.5 | 5/1994 | Denmark . | |
| 2531045 | 2/1984 | France . | |
| 2504350 | 10/1975 | Germany . | |
| 3800583 | 7/1989 | Germany ........................ | 198/785 |
| 90317 | 6/1982 | Japan ............................ | 198/787 |
| 276707 | 11/1990 | Japan ............................ | 198/780 |
| 136906 | 8/1952 | Sweden ........................ | 198/780 |
| 333762 | 12/1958 | Switzerland .................. | 198/780 |
| 1445830 | 12/1988 | U.S.S.R. ...................... | 198/787 |
| 1005086 | 9/1965 | United Kingdom . | |

OTHER PUBLICATIONS

Patent Abstracts of Japan, vo. 5, No. 65 (M–066) Apr. 30, 1981 & JP-A-56 017813 Toshiba Corp. Feb. 20, 1981 — abstract.
Patent Abstract of Japan, vol. 8, n0. 16 (M–270) Jan. 24, 1984 & JP-A-58 177846 (Tokyo Shibaura Denki KK) 18 Oct. 1983 abstract.
Patent Apbstracts of Japan vol. 13, No. 77 (M–801) Feb. 22, 1989 & JP-A-63 278880 (NEC Corp.) Nov. 16, 1988 — Abstract.
Patent Abstracts of Japan, vol. 16, No. 245 (M–1260) Jun. 1992 & JP-A-04–055017 (Kawasaki Steel Corp) 12 Feb. 1992 abstract.

*Primary Examiner*—Frank E. Werner
*Attorney, Agent, or Firm*—Antonelli, Terry, Stout, & Kraus, LLP

[57] ABSTRACT

Roller conveyor to arrive at the pinch-roll or other downstream usage device for feeding strip or wide flat products (13) in a hot strip rolling train, the roller conveyor comprising a plurality of parallel and substantially horizontal cylindrical rollers (14) having their axes perpendicular to the longitudinal axis of feed of the strip (13), the roller conveyor cooperating with at least one transversely movable guiding sidewall (17) having an inner surface cooperating with a lateral edge of the strip (13), at least each of the rollers (14) positioned immediately upstream of the downstream usage device consisting of two coaxial half-rollers, which are respectively a first half-roller (14a) and second half-roller (14b), at least the first half-roller (14a) being associated with the at least one guiding sidewall (17), the half-rollers (14a, 14b) being associated with independent respective motors (15a, 15b) governed by a control and actuation unit (16) which actuates the motors (15a, 15b) at least momentarily at different speeds, the control and actuation unit (16) being associated with monitoring devices (18) cooperating with the inner surface of the sidewall (17) and monitoring a condition of contact between the lateral edge of the strip (13) and the inner surface of the sidewall (17).

10 Claims, 1 Drawing Sheet

ROLLER CONVEYOR TO ARRIVE AT THE PINCH-ROLL OF THE WINDING REEL OF A HOT STRIP ROLLING TRAIN

BACKGROUND OF THE INVENTION

This invention concerns a roller conveyor to arrive at the pinch-roll of the winding reel of a hot strip rolling train or other downstream usage means.

The roller conveyor according to the invention is used in the field of the rolling of strip or wide flat products and is installed upstream of the pinch-roll of the winding reel.

This roller conveyor has the purpose of positioning transversely in relation to the winding unit the strip being fed longitudinally.

This transverse positioning of the strip can be carried out advantageously, but not necessarily, in such a way as to position the longitudinal axis of the strip on the longitudinal axis of the roller conveyor.

The roller conveyor according to the invention can be employed also in association with other machines in which it is necessary to control and ensure a correct transverse positioning of the strip being fed.

Rolling plants to produce strip and wide flat products include a winding unit to form coils.

The winding step entails a plurality of problems linked to the fact that the strip or wide flat product being fed has to be positioned transversely to ensure the formation of a properly wound coil.

In a particular case the strip or wide flat product is positioned with its longitudinal axis coinciding with the longitudinal axis of the roller conveyor.

In fact, it is known that, if the strip being fed is not properly positioned, the coil being formed has its wound layers partly offset laterally from each other, thus creating a "telescopic" shape.

So as to avoid this fault, systems have been disclosed in which at least a segment of the feeding roller conveyor lies on a plane inclined transversely to the horizontal plane and cooperates with positioning and guiding means comprising at least one substantially vertical sidewall.

According to a variant the roller conveyor consists of rollers shaped as a truncated cone with their axis lying substantially on a horizontal plane, the rollers defining a feeding plane transversely inclined to the horizontal plane.

In both cases the strip is kept constantly with at least one of its lateral edges in contact with the at least one guiding sidewall.

The at least one guiding sidewall can be moved transversely to the longitudinal axis of the roller conveyor so as to position the strip correctly according to the working parameters.

Moreover, the at least one guiding sidewall has to be positioned in relation to the plane of movement of the roller conveyor so as to determine a gap the height of which has to be smaller than the minimum thickness which can be rolled.

When the at least one guiding sidewall is displaced transversely, the height of the gap between that plane of movement and the lower edge of the guiding sidewall is altered in view of the angle formed between the at least one guiding sidewall and the plane of movement of the roller conveyor.

This transverse displacement of the at least one sidewall, depending on the direction in which the displacement takes place, leads to a gap greater than the thickness of the strip or causes contact between the guiding sidewall and the rollers.

So as to prevent this contact, the greater gap provided may cause possible occurrences of jamming of the strip within the gap itself, especially where the strips have a thickness of about 1 to 2 mm.

DE-U-9404883 discloses a device to rotate single elements during their movement from one processing station to the next one, the purpose being to orient a different side of those elements to processing tools positioned laterally.

This device comprises a roller conveyor, a first lateral abutment giving a first reference position and a second lateral abutment, which is offset from the median axis of the roller conveyor and has the task of rotating the single elements by a desired angle and of providing a second reference position for the single element to be fed to the next processing station.

In this document the roller conveyor consists of pairs of coaxial rollers supported at an intermediate position and possibly actuated independently with different speeds so as to impart the desired rotation to the single element.

In this document the half-rollers do not have the task of displacing a continuous element, such as a rolled strip, laterally and of keeping that element constantly in a correct position so as to improve the winding of the same but only have the task of correcting any ill-positioning of each single element by a given value.

In fact, in that document the first and second lateral abutments have the function of positioning the element properly in relation to the processing tools.

Moreover, this teaching concerns the handling of cold products with a stabilised surface but not products in a plastic state with problems of surface modifications due to the presence of hollows, gaps or other conditions in the rollers.

DE-C-4030222 discloses an adjustable lateral guiding bar associated with a roller conveyor consisting of parallel cylindrical rollers; this bar is inclined at a pre-set angle to the direction of feed of the product.

These products, sliding on the lateral guide bar, are forced to rotate and to arrange themselves with one straight side parallel to the guide bar, thus taking up the correct position.

This solution, however, cannot be employed for aligning continuous products such as a strip inasmuch as the inclination of the lateral bar imparts to the conveyed products a displacement substantially perpendicular to the direction of feed, and this displacement would compel the axis of the strip to be formed with an "S".

SUMMARY OF THE INVENTION

The present applicants have designed, tested and embodied this invention to overcome these shortcomings and to achieve further advantages.

The roller conveyor according to the invention enables a strip or a wide flat product to be positioned and guided transversely in a simple and safe manner in the step of winding on a pinch-roll.

The roller conveyor according to the invention can be associated with a winding unit or with any machine into which the strip has to be fed at a determined transverse position.

The roller conveyor according to the invention determines a horizontal plane of movement of the strip and arranges that at least a certain number of rollers of the roller conveyor positioned immediately upstream of the user machine consists of two coaxial cylindrical half-rollers having the same diameter, each of which is driven at least momentarily in an autonomous manner independently of the other half-roller.

At least one of the half-rollers is associated with at least one guiding sidewall, which can advantageously be moved transversely to the roller conveyor so as to determine the transverse position of the strip being wound.

According to a variant the roller conveyor according to the invention includes two guiding sidewalls.

The lower edge of the guiding sidewall defines together with the surface of the rollers a gap having a determined constant height, thus making the transverse displacement of the sidewall easy and without problems.

According to another variant the guiding sidewall can be moved perpendicularly too to the roller conveyor so as to define the height of the gap between the sidewall and the rollers.

The transverse displacement of the strip, so as to ensure its continuous contact with the guiding sidewall, is obtained by rotating the half-rollers associated with that guiding sidewall at a strictly controlled speed different from that of the coaxial and corresponding half-rollers.

When the strip is in its correct transverse position and below the pinch-roll, the two coaxial half-rollers are synchronised in their rotation.

In the roller conveyor according to the invention the half-rollers associated with the guiding sidewall have a length normally different from the other half-rollers.

In the roller conveyor according to the invention the half-rollers associated with the guiding sidewall have a length generally between three-tenths and one half of the width of the roller conveyor.

This asymmetrical embodiment, which includes one half-roller longer than the other, is advantageous so that, by keeping the zone of separation between the two half-rollers substantially on the axis of the winding reel, the roller conveyor does not of necessity have to have a width equal to the width of the strip.

A width of the roller conveyor greater than the width of the strip is in fact substantially necessary to ensure the versatility and flexibility of the roller conveyor itself and to avoid the danger of lateral scraping and jamming of the strip.

By using asymmetrical half-rollers, with the half-roller associated with the sidewall being shorter than the other half-roller, this requirement of a coaxial positioning of the strip and winding reel is maintained, and at the same time the obtaining of a greater torque of rotation imparted by the two coaxial half-rollers, given an equal difference of speed, is ensured.

In the roller conveyor according to the invention the gap separating the two coaxial half-rollers is the smallest possible so as to ensure that this gap does not lead to scraping or abrasion on the lower surface of the strip passing through, for such scraping or abrasion could change the surface quality of the product.

The roller conveyor according to the invention is associated with a control and actuation unit which governs the motors associated with the respective half-rollers; this control and actuation unit can be of a manual type.

According to a variant the control and actuation unit is automatic and works according to signals received from appropriate position monitoring means monitoring the edge of the strip.

These position monitoring means check the correctness of the position of the strip in relation to the axis of the winding reel and send signals to the control and actuation unit, which governs the motors associated with the respective half-roller so as to adjust the speed of the half-rollers in order to obtain the desired transverse displacement of the strip.

These position monitoring means are associated with the guiding sidewall in a preferred embodiment of the invention.

These position monitoring means are pre-arranged to check that the lateral edge of the strip is always kept in contact with the inner surface of the sidewall.

In such a situation of contact between the strip and the sidewall the position monitoring means send a signal to the actuation unit, which conditions consequently the motors associated with the pairs of half-rollers so as to actuate the half-rollers of each pair at a synchronised speed.

As soon as these position monitoring means find a separation of the strip from the sidewall, a corrective signal is sent which acts on the motors so as to alter substantially instantaneously the speed of one of the two half-rollers, according to a pre-set programmer, so as to re-establish the correct conditions of contact.

BRIEF DESCRIPTION OF THE DRAWINGS

The attached figures are given as a non-restrictive example and show a preferred embodiment of the invention as follows.

DETAILED DESCRIPTION OF THE PREFERRED EMBODIMENTS

Figure 2:
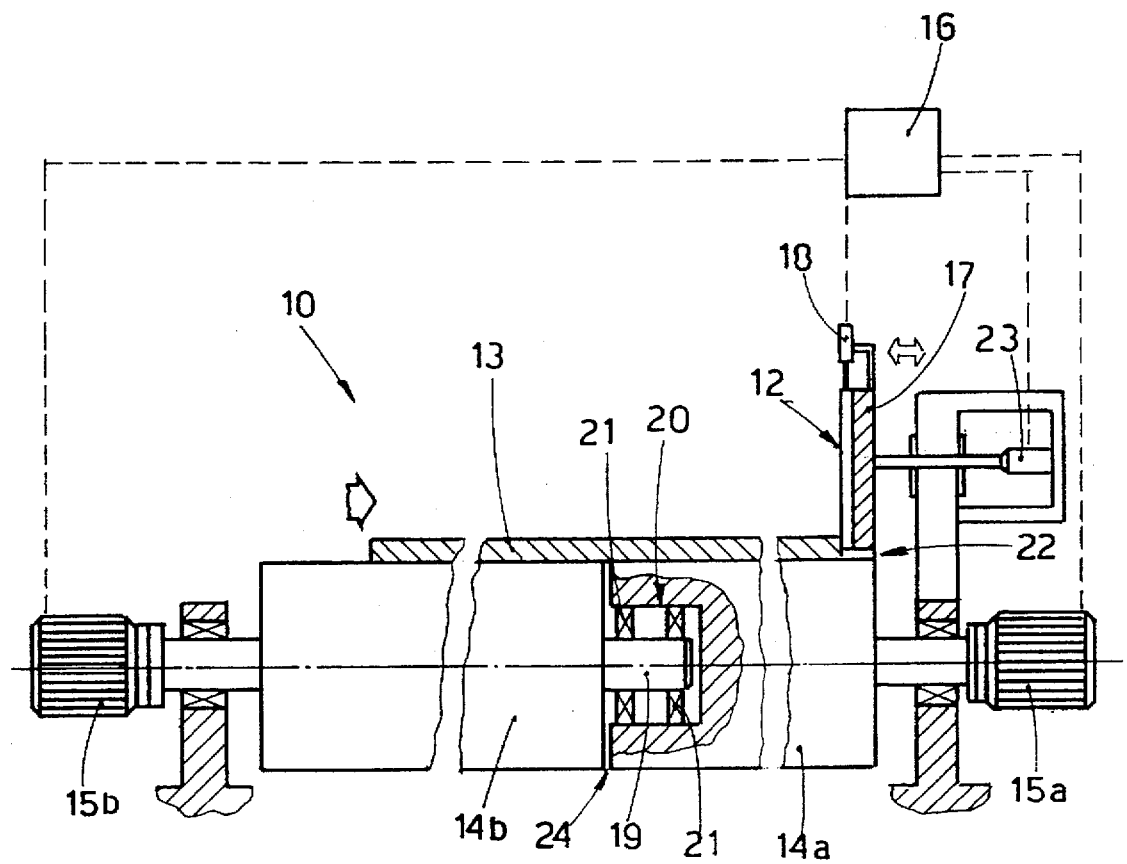
FIG. 2 is a diagram in an enlarged scale of a cross-section of the roller conveyor along the line A—A of FIG. 1.
Figure 1:
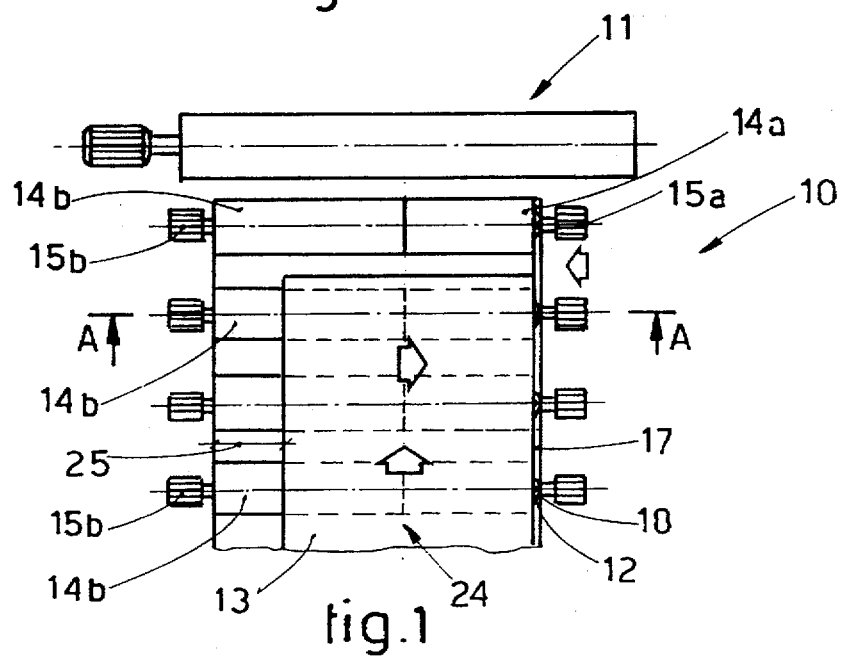
FIG. 1 is a diagrammatic plan view of a roller conveyor according to the invention.

The reference number 10 in the figures denotes generally a roller conveyor according to the invention.

In this case the roller conveyor 10 according to the invention is employed to feed longitudinally a strip or wide flat product 13 and is installed upstream of a pinch-roll 11 comprising a means to wind strip or wide flat products 13.

The roller conveyor 10 cooperates with at least one guiding sidewall 17 extending longitudinally and associated with the upper surface of the roller conveyor 10.

The guiding sidewall 17 can be adjusted transversely to the roller conveyor 10 so as to determine the correct transverse position of the strip or wide flat product 13 being fed.

In this case the transverse adjustment of the guiding sidewall 17 is carried out by actuators 23.

The strip or wide flat product 13 being fed is caused to cooperate at one of its lateral edges with the guiding sidewall 17 so as to ensure its correct transverse positioning.

This correct transverse positioning provides for the median axis of the strip 13 to coincide substantially with the axis of the winding reel positioned downstream.

The roller conveyor 10 lies on a horizontal or substantially horizontal plane and consists of a plurality of rollers 14 parallel to each other and perpendicular to the direction of feed of the strip 13.

Each of at least a given number of rollers 14, advantageously those positioned immediately upstream of the winding machine, consists of two half-rollers, a first half-roller 14a and a second half-roller 14b respectively, which are cylindrical and coaxial and have the same diameter.

The first half-rollers 14a and second half-rollers 14b can be set in rotation independently of each other at least momentarily.

In the roller conveyor 10 according to the invention the first half-rollers 14a associated with the guiding sidewall 17 have a length generally between three-tenths and a half of the width of the roller conveyor 10.

In the event that the half-roller 14a associated with the sidewall 17 is shorter than the half-roller 14b, the zone of separation referenced with 24 between the two half-rollers 14 coincides with the median axis of the strip 13 and thus with the axis of the downstream winding reel, while maintaining a greater width of the roller conveyor 10 than the width of the strip 13.

This greater width referenced with the zone 25 of the half-rollers 14b makes the roller conveyor 10 suitable to tend a variety of sizes of the strip 13 and prevents possible lateral scraping and jamming of the strip 13 being fed.

This zone of separation 24 has the smallest possible size so as not to create zones of scraping which could alter the surface quality of the lower surface of the strip 13 being fed.

In this case the first half-rollers 14a and second half-rollers 14b are driven by their own respective motors 15a and 15b which are advantageously governed by a control and actuation unit 16.

This control and actuation unit 16 can be of a manual type or an automatic type.

So as to ensure that the strip 13 being wound is always in contact with the guiding sidewall 17, the first half-rollers 14a associated with the guiding sidewall 17 are driven at an angular speed lower than that of the second half-rollers 14b, thus causing a transverse displacement of the strip or wide flat product 13 in the direction of its approaching and even coming into contact with the guiding sidewall 17.

When the strip or wide flat product 13 has been correctly positioned, the first half-rollers 14a and second half-rollers 14b are driven in synchronisation by the control and actuation unit 16 which governs the respective motors 15a, 15b.

According to the form of embodiment shown in FIG. 2 the roller conveyor 10 includes at least a position monitoring means 18 monitoring the edge of the strip 13.

This position monitoring means 18 is advantageously associated with the guiding sidewall 17 so as to check whether contact is taking place or not between the strip 13 being fed and the guiding sidewall 17.

In this case, the guiding sidewall 17 includes, in correspondence with each position monitoring means 18, a recess 12 for installation of the position monitoring means 18 on the same axis as the contact surface of the guiding sidewall 17.

The at least one position monitoring means 18 is advantageously associated with the control and actuation unit 16, thereby enabling the strip 13 to be displaced laterally automatically and at once when the at least one position monitoring means 18 detects a transverse swerving of the strip 13 away from the guiding sidewall 17.

This makes possible a very immediate and timely action to correct the positioning of the strip 13, thus ensuring that the strip 13 is always kept in contact with the sidewall 17 and that the median axis of the strip 13 coincides with the axis of the downstream winding reel.

In this case the two respective first 14a and second 14b half-rollers are associated with each other by an axial extension 19 of a reduced cross-section, which is associated terminally with the second half-roller 14b and cooperates with bearing means 21 fitted within a coaxial seating 20 machined in the corresponding first half-roller 14a.

According to a variant, which is not shown here, the guiding sidewall 17 can be moved perpendicularly to the plane of positioning defined by the roller conveyor 10 so as to adjust the height of the gap 22 between the lower edge of the guiding sidewall 17 and the rollers 14.

I claim:

1. A roller conveyor for feeding strip products or wide flat products in a hot strip rolling train to a downstream usage means comprising:

a plurality of parallel and substantially horizontal cylindrical rollers having their axes perpendicular to a longitudinal axis of feed of products, each of at least those rollers immediately downstream of the downstream usage means comprising coaxial first and second half rollers;

at least one transversely movable guiding sidewall provided adjacent the first half rollers and having an inner surface against which a lateral edge of the products can cooperate so as to ensure correct transverse positioning of the products;

driving means for driving the first half rollers independently of the second half rollers;

at least one monitor for monitoring whether or not the lateral edge of the products is in contact with the inner surface of the guiding sidewall;

a control and actuation unit, responsive to the monitor, for actuating the driving means so as to at least momentarily drive the first and second half rollers at different speeds.

2. Roller conveyor as in claim 1, in which the speed of the first half-roller (14a) is slower than that of the second half-roller (14b) at least momentarily.

3. Roller conveyor as in claim 1, in which a zone of separation between the two half-rollers coincides substantially with a median axis of the product being fed.

4. Roller conveyor as in claim 3, in which the zone of separation has a minimum possible width.

5. Roller conveyor as in claim 1, in which the first half-roller associated with the guiding sidewall has a length between three-tenths and a half of a width of the cylindrical roller.

6. Roller conveyor as in claim 1, wherein the cylindrical rollers have a width greater than a width of the product being fed, this greater width being defined by a zone of the second half-roller not associated with the sidewall.

7. Roller conveyor as in claim 1, in which each monitor is associated with a relative recess machined in a contact face of the guiding sidewall.

8. Roller conveyor as in claim 1, in which the two coaxial half-rollers are associated with each other by an axial supporting extension of one of the two half-rollers, this extension extending into a mating seating in the other half-roller.

9. Roller conveyor as in claim 1, in which the guiding sidewall can be moved perpendicularly to a plane of positioning of the strip.

10. Roller conveyor as in claim 1, wherein said driving means comprise independent motors, each motor driving respective ones of the first and second half rollers.

* * * * *